(12) United States Patent
Williams

(10) Patent No.: US 7,470,218 B2
(45) Date of Patent: Dec. 30, 2008

(54) WALK SIMULATION APPARATUS FOR EXERCISE AND VIRTUAL REALITY

(76) Inventor: Julian David Williams, 2325 California Ave., Santa Monica, CA (US) 90403

( * ) Notice: Subject to any disclaimer, the term of this patent is extended or adjusted under 35 U.S.C. 154(b) by 3 days.

(21) Appl. No.: 10/853,886

(22) Filed: May 26, 2004

(65) Prior Publication Data

US 2004/0242390 A1 Dec. 2, 2004

Related U.S. Application Data

(60) Provisional application No. 60/474,780, filed on May 29, 2003.

(51) Int. Cl.
*A63B 22/04* (2006.01)
*A63B 23/00* (2006.01)

(52) U.S. Cl. .......................... 482/51; 482/148

(58) Field of Classification Search .............. 482/1–148
See application file for complete search history.

(56) References Cited

U.S. PATENT DOCUMENTS

| | | | | |
|---|---|---|---|---|
| 2,826,424 A | * | 3/1958 | Erickson | 280/18.1 |
| 2,842,365 A | * | 7/1958 | Kelley | 482/51 |
| 2,971,767 A | * | 2/1961 | Eaton | 280/18.1 |
| 3,642,279 A | * | 2/1972 | Cutter | 482/54 |
| 4,114,873 A | * | 9/1978 | Jones | 482/42 |
| 4,988,090 A | * | 1/1991 | Schmitt | 472/116 |
| 5,509,870 A | * | 4/1996 | Lloyd | 482/51 |
| 5,562,572 A | | 10/1996 | Carmein | |
| 5,846,134 A | * | 12/1998 | Latypov | 463/46 |
| 5,897,461 A | * | 4/1999 | Socwell | 482/54 |
| 5,902,214 A | | 5/1999 | Makikawa et al. | |
| 6,106,397 A | * | 8/2000 | Phillips | 463/36 |
| 6,131,075 A | | 10/2000 | Tai et al. | |
| 6,135,928 A | | 10/2000 | Butterfield | |
| 6,270,414 B2 | | 8/2001 | Roelofs | |
| 6,470,631 B1 | * | 10/2002 | Rechsteiner | 52/81.1 |
| 6,563,489 B1 | | 5/2003 | Latypov et al. | |
| 6,743,154 B2 | * | 6/2004 | Epstein | 482/54 |
| 6,984,195 B1 | * | 1/2006 | Phillips | 482/71 |
| 2003/0232698 A1 | | 12/2003 | Couvillion, Jr. et al. | |

* cited by examiner

*Primary Examiner*—Steve R Crow
(74) *Attorney, Agent, or Firm*—Venable LLP; Stefan J. Kirchanski; Matthew J. Spark

(57) ABSTRACT

A device is disclosed that enables a user to perform a simulation of walking and running. The device comprises a locomotion platform which is has a concave upward facing surface. The platform and or the user's footwear incorporate a means to reduce friction to allow their feet to move freely.

4 Claims, 4 Drawing Sheets

US 7,470,218 B2

WALK SIMULATION APPARATUS FOR EXERCISE AND VIRTUAL REALITY

CROSS-REFERENCE

This publication claims the benefit of PPA 17522 USPTO 60/474780

FEDERALLY SPONSORED RESEARCH

Not applicable

SEQUENCE LISTING OR PROGRAM

Not applicable

FIELD OF INVENTION

This invention relates to an exercise platform.

BACKGROUND OF THE INVENTION

There is a growing demand for exercise machines to become more entertaining and less tedious. Similarly, users of virtual reality computer games wish to enhance their experience through physical stimulation and exertion, thereby increasing their "immersion" in the game. To this end many developments have sought to improve the computer gaming experience, for instance through three-dimensional visual graphics,' surround sound' audio and various devices that provide a physical feedback.

As many games require the player to walk or run around a virtual world several inventions have attempted to simulate walking and running. The key challenge to accomplishing this is to achieve a means of multi-directional movement within the restricted space usually required of such a game, while keeping the whole device compact.

A feature of walking/running exercise devices is that they tend to be computer controlled as opposed to providing an input to a computer. For instance a treadmill requires the user to input the desired speed it should operate at. There are dangers associated with forcing a user to 'keep up' with a machine and they may suffer comfort and modesty issues due to the jogging motion. Another feature of many existing devices is that it can be difficult or even impossible to change direction. Ideally a locomotion platform should allow a user to traverse freely in any horizontal direction for any amount of time.

Phillips' U.S. Pat. No. 6,106,397 demonstrates that when a user is constrained to a limited platform area while performing a walk action their movements can be monitored and the data used as input to a computer program.

SUMMARY OF THE INVENTION

The objective of the disclosed invention is to provide a locomotion platform. The apparatus is a concave platform for a user to stand on. The platform and/or the user's footwear are manufactured in such a way as to reduce the friction between them. Further objectives are that the user remains constrained to the platform area and that they may turn and walk in any horizontal direction.

BRIEF DESCRIPTION OF DRAWINGS

Various exemplary embodiments of this invention will be described in detail, with reference to the following figures, wherein.

DETAILED DESCRIPTION OF THE INVENTION

Notwithstanding any other forms that may fall within the scope of the present invention, preferred forms of the invention will now be described, by way of example only.

Figure 1:
FIG. 1 shows a user standing upon a platform according to the first embodiment of the invention.

FIG. 1 illustrates one exemplary embodiment of the locomotion platform 2. The platform upper surface 6 is concave and upward facing. The platform 2 is of firm enough construction to support a user's weight without deforming. A user wearing virtual reality eyewear 8 can stand upon the platform 2 and slide their feet back and fore across the platform's upper surface 6 in a simulated walk action. For example, from a standing position at the center 12 of the platform their right foot can be slid forward as their left foot is slid back until they reach a point where the their feet are the distance apart of a normal pace and equidistant from the center 12 of the platform. To take another step the user would slide their right foot back at the same time as sliding their left foot forward until they have again completed a pace. The concave nature of the platform upper surface 6 is of a profile or angle that facilitates a user as they slide their feet across the upper surface. The concave profile is approximately spherical with a radius of curvature at least equal to the length of the user's legs 20.

A change in direction is achieved by altering the direction in which the user's feet are slid. As an example, to turn right, the right foot can be slid forward and to the right simultaneously while the left foot slides backward and to the left.

Figure 2:
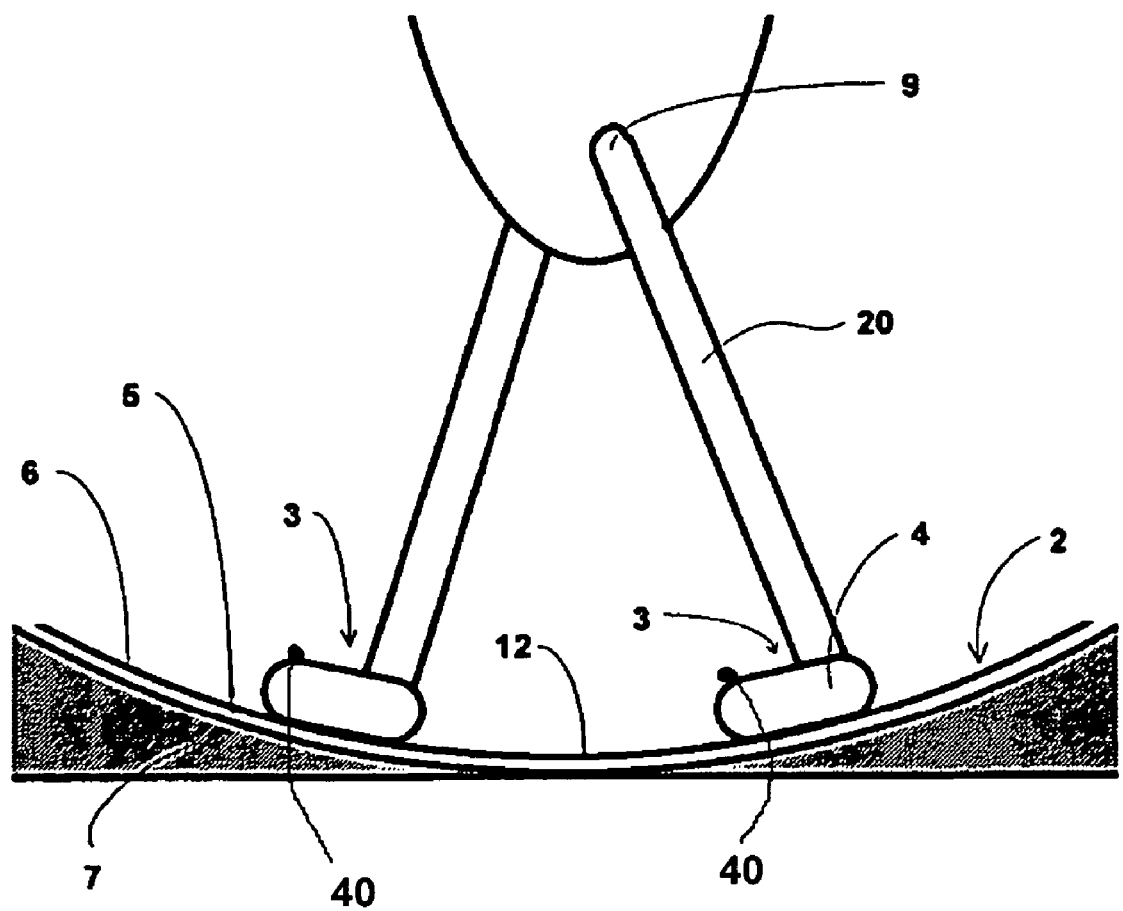
FIG. 2 is a cross-sectional side view of the platform shown in FIG. 1.

FIG. 2 shows a partial cross-sectional view of the platform 2 illustrating braces 7 to prevent movement of the platform 2 during use. The whole assembly should rest on horizontal terrain. For most adult or adolescent users the platform 2 needs to be approximately four feet diameter, or slightly more than a full walking stride in the horizontal plane. The platform base 5 may be constructed from any suitable material, for example metal, wood, plastic, ceramic or toughened glass.

In one mode of use the platform upper surface 6 shown in FIG. 1 may be coated with, or manufactured from, a material such as PTFE that reduces the coefficient of friction between the user's footwear and the platform upper surface 6. Alternatively the upper surface 6 can be painted and treated with polish, wax or a suitable lubricant. The user can wear footwear 4 with soles designed to minimize the friction between their feet and the upper surface. Examples of the footwear sole material include PTFE or silk.

The view from above the active platform 2 area is circular. The lowest point of the concave platform 2 is in its center. In this respect the platform 2 could be described as dish shaped. The user is thus able to move, crouch or jump vertically, and change the direction they are facing without impediment.

FIG. 2 illustrates that from a cross-sectional view the concave platform 2 describes an arc, which has a radius that is at least the distance from the base of the user's footwear 4 to their hip joint 9. This facilitates ease of leg movement, as their center of gravity will not move substantially and the angle 3 of their foot 4 with respect to its leg 20 will remain fairly constant. The body of the user should not move substantially away from the center of the dish as they move their legs. The contour of the platform 2 is the same in every direction from the center.

Figure 3:
FIG. 3 shows a view according to the alternative embodiment of the platform where the upper surface friction is reduced by the user wearing roller-skates.
Figure 4:
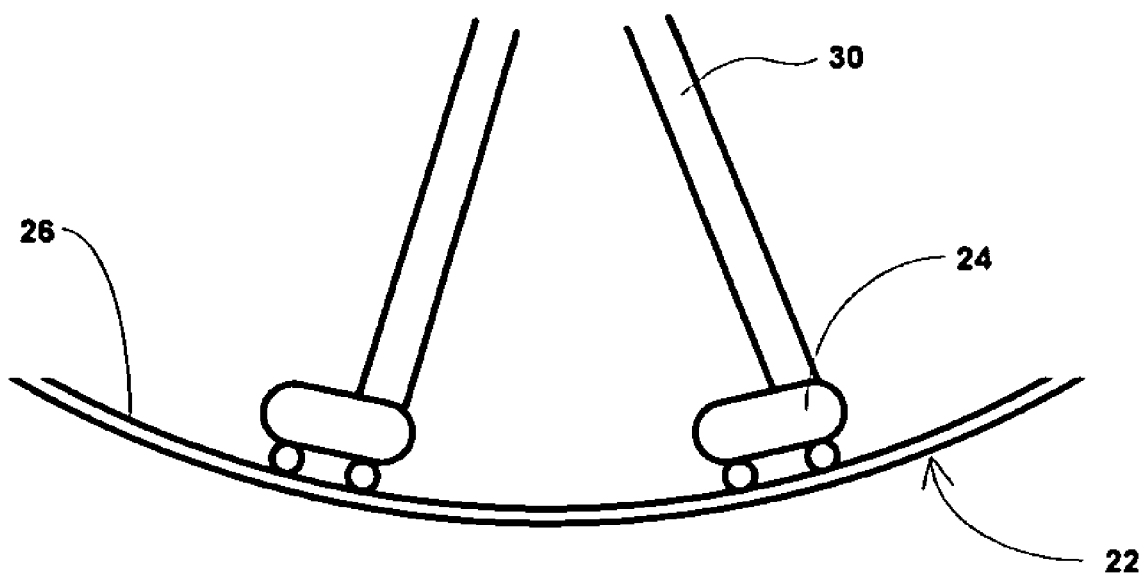
FIG. 4 shows a cross-sectional side view of the platform shown in FIG. 3.

In another exemplary embodiment shown in FIG. 3, the platform 22 is of the same shape and is used as previously described but is not coated or manufactured from a specifically friction reducing material. In this instance the user wears roller skates or similar footwear 24, which are designed to roll over a fixed upper surface 26. The same arrangement is illustrated in cross-sectional view FIG. 4. The friction reduction, which is necessary for the user's feet to slide easily over the concave platform 22, is in this case achieved by the user wearing roller skates 24. The upper surface 26 in this example would not be treated with polish, wax or lubricant. The actual coating if needed would be dependant on the particular material chosen for the platform 22, and would provide sufficient grip to prevent the wheels of the user's footwear 24 from skidding.

Notwithstanding that the locomotion platform of the present invention may be used simply for the purpose of exercise, the movement thus obtained is suitable for detection via electronic sensors. The data thus derived can be used by a computer program for analysis or as user input. Multiple methods of movement detection are possible. The following examples outline some of the methods to derive the movement data.

In one mode of use, the user wears virtual reality eyewear 28 and wears 3-dimensional tracking devices on or close to their feet. 3-dimensional tracking devices are typically used for motion capture. These devices output channels of information that corresponds to their X, Y and Z position relative to a magnetic source. A computer program that samples the X, Y, and Z position at sufficient intervals can compute the user's speed and direction. To calibrate this system the sensors would be placed at certain predefined positions relative to the platform, such as the center and at the limits of where the user's feet would be expected to travel. The computer program would then monitor the X, Y, and Z position of the sensors and calculate by reference to the calibration points how far the sensors moved in each sample time interval and therefore how fast they were moving and if they had changed direction. This arrangement can also operate in the reverse sense, whereby the user wears the reference sources and the sensors are mounted in the platform or nearby.

REDLINE In one mode of use, the user wears 3-dimensional tracking devices 40 on or close to their feet. 3-dimensional tracking devices are typically used for motion capture. These devices output channels of information that corresponds to their X, Y and Z position relative to a magnetic source. A computer program that samples the X, Y, and Z position at sufficient intervals can compute the user's speed and direction. To calibrate this system the sensors would be placed at certain predefined positions relative to the platform, such as the center and at the limits of where the user's feet would be expected to travel. The computer program would then monitor the X, Y, and Z position of the sensors and calculate by reference to the calibration points how far the sensors moved in each sample time interval and therefore how fast they were moving and if they had changed direction. This arrangement can also operate in the reverse sense, whereby the user wears the reference sources and the sensors are mounted in the platform or nearby.

In another mode of use, the platform upper surface contains a plurality of pressure sensors. These are activated as the user's feet press upon them. By analyzing the position and sequence of activated sensors, relative to time, the user's speed and direction is computed.

In another mode of use, the user wears visual reference markings. Optical sensors detect the absolute or relative position of these markings. Sampling the marker positions at sufficient time intervals and comparing these against elapsed time enables the user's speed and direction to be computed.

Other methods of position and movement detection are possible.

The embodiments of the present invention described above are to be deemed in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A portable locomotion platform device lacking handles or anything for a user to grab onto with hands, the locomotion platform device permitting a user to walk, or run, crouch, jump or change direction, and continue these motions without impediment, while remaining constrained to the area of the device, the device comprising:

a platform with an upward facing, essentially spherically concave continuous surface upon which the user stands while performing the motions, wherein said essentially spherically concave surface has a radius about the distance from a base of a user's foot to the user's hip joint;

the concave surface of the platform being a low friction, fixed surface, firm enough to support a user's weight without substantial deformation;

means for reducing the friction of a user's feet contacting the surface of the platform sufficiently to allow omni-directional motion, wherein the means for reducing friction is selected from the group consisting of wax, polish, lubricant, and polytetrafluoroethylene; wherein the user does not move substantially away from a center of the platform as the user moves their feet; and a brace connected to and surrounding an underside surface of the platform in order to prevent movement of the platform during use.

2. The device according to claim 1, wherein the user wears footwear that includes a low friction sole.

3. The device according to claim 1, wherein the user wears footwear that includes wheels.

4. A portable locomotion platform device lacking handles or anything for a user to grasp onto with hands, the locomotion platform device permitting the user to walk, or run, crouch, jump or change direction, and continue these motions without impediment, while remaining constrained to a central area of the device, the device consisting essentially of:

a stand-alone, stationary, dish-shaped, open platform having an upward facing, essentially spherically concave continuous surface upon which the user stands while performing the motions, wherein said essentially spherically concave surface has a radius about the distance from a base of the user's foot to the user's hip joint;

said concave surface of the platform comprising a low friction, fixed surface, firm enough to support a user's weight without substantial deformation; and means for reducing contact friction between feet of the user and the surface of the platform sufficiently to allow omni-directional motion; wherein the friction reducing means includes a low friction interface engaging the feet, disposed between the feet and the surface of the platform; wherein the user does not move substantially away from a center of the platform as the user moves their feet;

and a brace connected to and surrounding an underside surface of the platform in order to prevent movement of the platform during use.

* * * * *